United States Patent
Song et al.

(10) Patent No.: US 6,848,427 B2
(45) Date of Patent: Feb. 1, 2005

(54) METHOD AND SYSTEM FOR PROVIDING FUEL INJECTION TIME SCHEDULING FOR INTERNAL COMBUSTION ENGINES USING ENGINE SPEED PREDICTION

(75) Inventors: Gang Song, Canton, MI (US); James Michael Kerns, Trenton, MI (US); Stephen B. Smith, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 10/350,969

(22) Filed: Jan. 23, 2003

(65) Prior Publication Data

US 2004/0144369 A1 Jul. 29, 2004

(51) Int. Cl.[7] .......................... F02D 41/06; F02M 51/00
(52) U.S. Cl. ...................... 123/486; 123/491; 701/104; 701/113
(58) Field of Search ................. 123/436, 478, 123/480, 486, 491–493; 701/101–105, 110, 111, 113

(56) References Cited

U.S. PATENT DOCUMENTS

| | | | |
|---|---|---|---|
| 5,068,794 A | 11/1991 | Hosaka | 701/104 |
| 5,386,810 A * | 2/1995 | Gronenberg et al. | 123/436 |
| 5,497,329 A * | 3/1996 | Tang | 701/104 |
| 5,522,367 A | 6/1996 | Reuschenbach et al. | 123/492 |
| 5,537,982 A | 7/1996 | Milunas et al. | 123/492 |
| 5,726,892 A * | 3/1998 | Tang et al. | 701/110 |
| 5,732,381 A | 3/1998 | Guido et al. | 701/104 |
| 5,735,249 A | 4/1998 | Parke et al. | 123/491 |
| 6,079,396 A | 6/2000 | Ament et al. | 123/674 |
| 6,223,730 B1 * | 5/2001 | Hasegawa et al. | 123/491 |
| 6,363,316 B1 | 3/2002 | Soliman et al. | 701/104 |

FOREIGN PATENT DOCUMENTS

| | | | |
|---|---|---|---|
| JP | 60 - 60236 A | * | 4/1985 |
| JP | 04 - 12148 A | * | 1/1992 |
| JP | 2003 - 269235 A | * | 9/2003 |

* cited by examiner

Primary Examiner—Willis R. Wolfe, Jr.

(57) ABSTRACT

A system and process for determining fuel injection time scheduling in an internal combustion engine. The system and method uses a prediction of engine speed to compensate for the errors due to rapid speed change in fuel injection during crank/start and engine speed transition like engine tip-in and tip-out.

16 Claims, 6 Drawing Sheets

METHOD AND SYSTEM FOR PROVIDING FUEL INJECTION TIME SCHEDULING FOR INTERNAL COMBUSTION ENGINES USING ENGINE SPEED PREDICTION

TECHNICAL FIELD

This invention relates to internal combustion engines, and more particularly to fuel injection system used in such internal combustion engines.

BACKGROUND AND SUMMARY OF THE INVENTION

As is know in the art, fuel injection systems are used to inject an amount of fuel into cylinders of an internal combustion engine. The fuel injection process is one of the most critical events in the preparation of air/fuel mixing in an internal combustion engine. It effects combustion quality and engine-out emissions. Electronic control units determine the amount of fuel to be injected into such cylinders and the time of such fuel injection and command the fuel injection system to provide such amount at such time. The amount of fuel to be injected into such cylinder is calculated by an engine control unit (ECU) as a function of the air quantity passing to the cylinder as measured by an mass air flow (MAF) sensor or indirectly measured by manifold absolute pressure (MAP) sensor. In one such system, the ECU determines the pulse width to turn on the injector to provide the desired amount of fuel to that cylinder; such systems are commonly called pulse width modulated (PWM). The constant amplitude pulse has a time duration, or fuel pulse width (FPW), related to the calculated fuel quantity. The ECU also determines the time at which such fuel is to be injected into the cylinder. The time of injection is such that the injection occurs at a proper engine crank angle associated with one of the cycles of a four-stroke engine, for example. That is, the time of injection, or targeting injection position, is crank angle based, while the quantity of fuel is time-based. There is a conversion provided by the ECU between crank angle based parameters and time-based parameters. The conversion is calculated based on engine speed. The ending location of fuel injection may be at either closed-valve or open-valve. More particularly, in port injection, closed-valve injection (CVI) strategy is targeting the end of injection (EOI) at closed-valve while the open valve injection (OVI) expects the end of injection (EOI) happens during intake valve open.

The fuel injection process is even more critical for the timing request for starting location of fuel injection in DISI stratified engine and camless engines. Optimized starting of fuel injection maximizes the formation of a fuel cloud around the spark plug in the time frame of spark release. The fuel injection pulse lasts from several milliseconds to dozens of milliseconds depending on design of injector, fuel rail pressure, cylinder volume, and engine conditions. In cold crank and start-up, it generally needs longer fuel pulses to get enough vaporized fuel into the port or cylinder to generate the proper fuel/air mixture for combustion.

As noted above, there is a conversion provided by the ECU between crank angle based parameters and time-based parameters. The conversion is calculated based on engine speed. We have recognized that there if there is any error in engine speed, such error introduces error into the delivered fuel injection position. The speed errors can be due to either measurement error or the speed variation. The invention provides an approach to compensate for the error due to rapid speed change in fuel injection during crank/start and engine speed transition like engine tip-in and tip-out in an internal combustion engine. The invention includes two methods of engine speed prediction. One is polynomial model based engine speed prediction In accordance with the invention, a method is provided for determining fuel injection time scheduling in an internal combustion engine. The method includes calculating a fuel time schedule for the engine using a prediction of engine speed at the time of such fuel injection.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
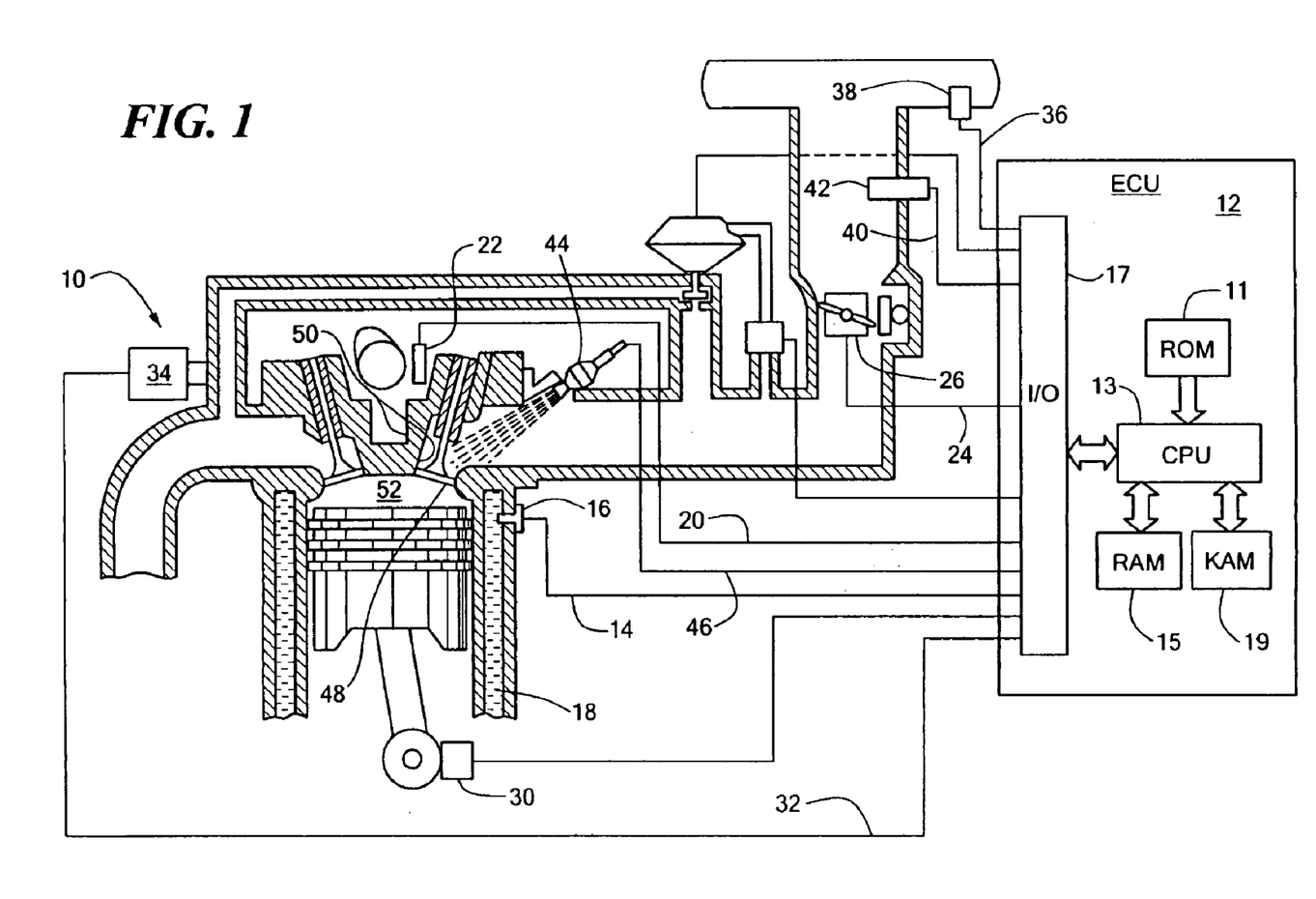
FIG. 1 is a diagram of an internal combustion engine having a fuel injection system according to the invention.

Referring now to FIG. 1, there is shown a schematic diagram of an internal combustion engine which incorporates the teachings of the present invention. The internal combustion engine 10 comprises a plurality of combustion chambers, or cylinders, one of which is shown in FIG. 1. The engine 10 is controlled by an Electronic Control Unit (ECU) 12 having a Read Only Memory (ROM) 11, a Central Processing Unit (CPU) 13, a Random Access Memory (RAM) 15, and a Keep Alive Memory (KAM) 19, which retains information when the ignition key is turned off for use when the engine is subsequently restarted. The ECU 12 can be embodied by an electronically programmable microprocessor, a microcontroller, an application-specific integrated circuit, or a like device to provide the predetermined control logic. It is noted that while a port injection engine system is described the invention may be used with other engine systems such as direct injection engines. The present invention applies to engine with variable cam timing, variable cam lift, and variable compression ratio. The present invention further applies to engines used in hybrid electric vehicles.

The ECU 12 receives a plurality of signals from the engine 10 via an Input/Output (I/O) port 17, including, but not limited to, an Engine Coolant Temperature (ECT) signal 14 from an engine coolant temperature sensor 16 which is exposed to engine coolant circulating through coolant sleeve 18, a crank shaft angle sensor signal 20 from a crank shaft angle (CPS) sensor 30, a throttle position signal 24 generated by a throttle position sensor 26 indicating the position of a throttle plate (not shown) operated by a driver, a Heated Exhaust Gas Oxygen (HEGO) signal 32 from a HEGO sensor 34, an air intake temperature signal 36 from an air temperature sensor 38, an air charge, or flow, signal 40 from a mass air flow (MAF) sensor 42.

The ECU 12 processes these signals and generates corresponding signals, such as a fuel injector pulse waveform signal transmitted to the fuel injector 44 on signal line 46 to control the amount of fuel delivered by the fuel injector 44. ECU 12 also generates a combustion initiation signal (not shown) for receipt by a spark plug (not shown,) to initiate combustion of the air and fuel in the cylinder. Intake valve 48 operates to open and close intake port 50 to control the entry of the air/fuel mixture into combustion chamber 52.

Figures 2, 2A:
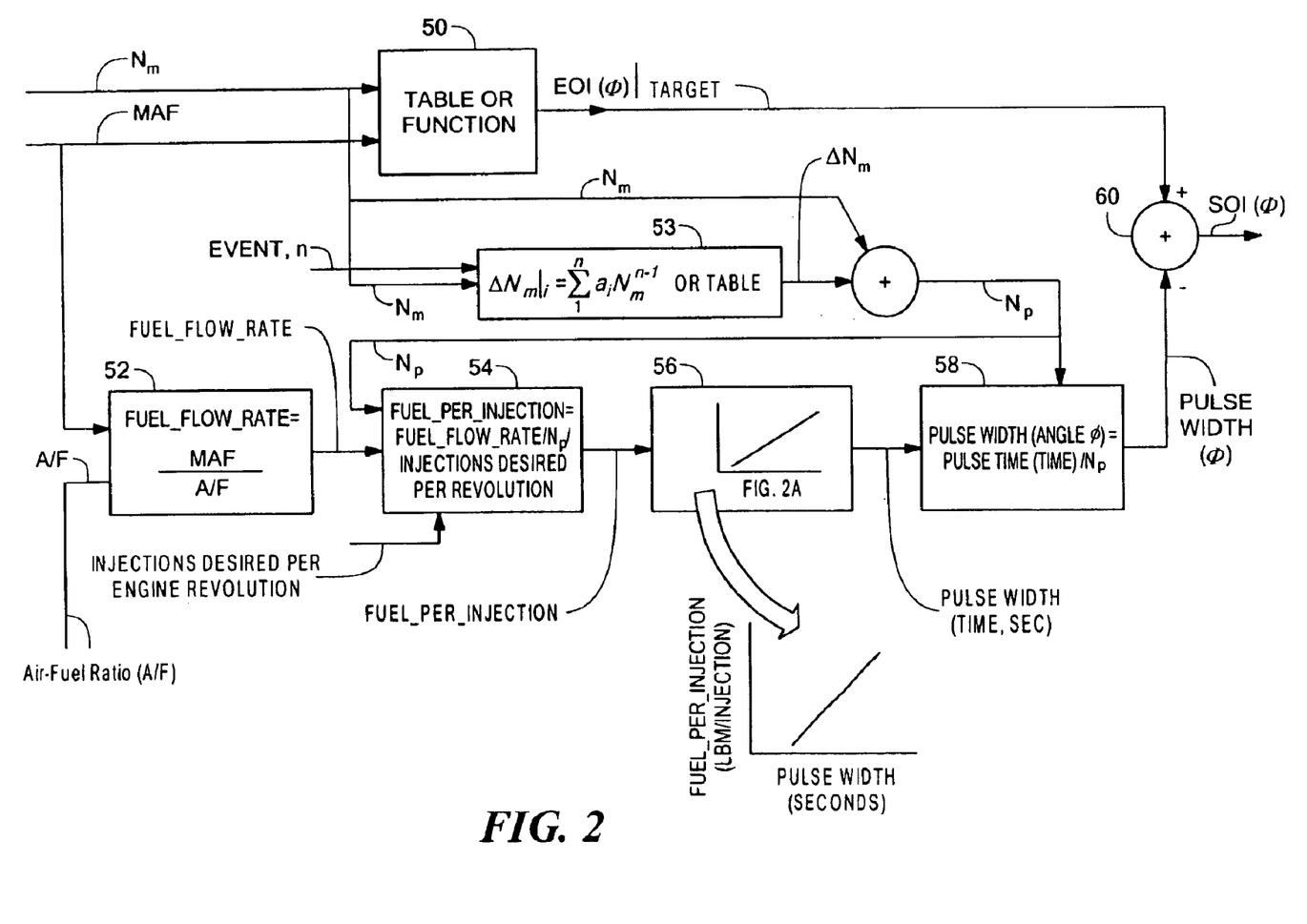
FIG. 2 is a functional diagram showing the process used to determine start of fuel injection (SOI) and fuel pulse width (FPW) based on the predicted engine speed, $N_P$.
FIG. 2A is a curve showing a relationship between fuel flow and fuel pulse width for a representative fuel injector used in the engine of FIG. 1.
Figure 2A:
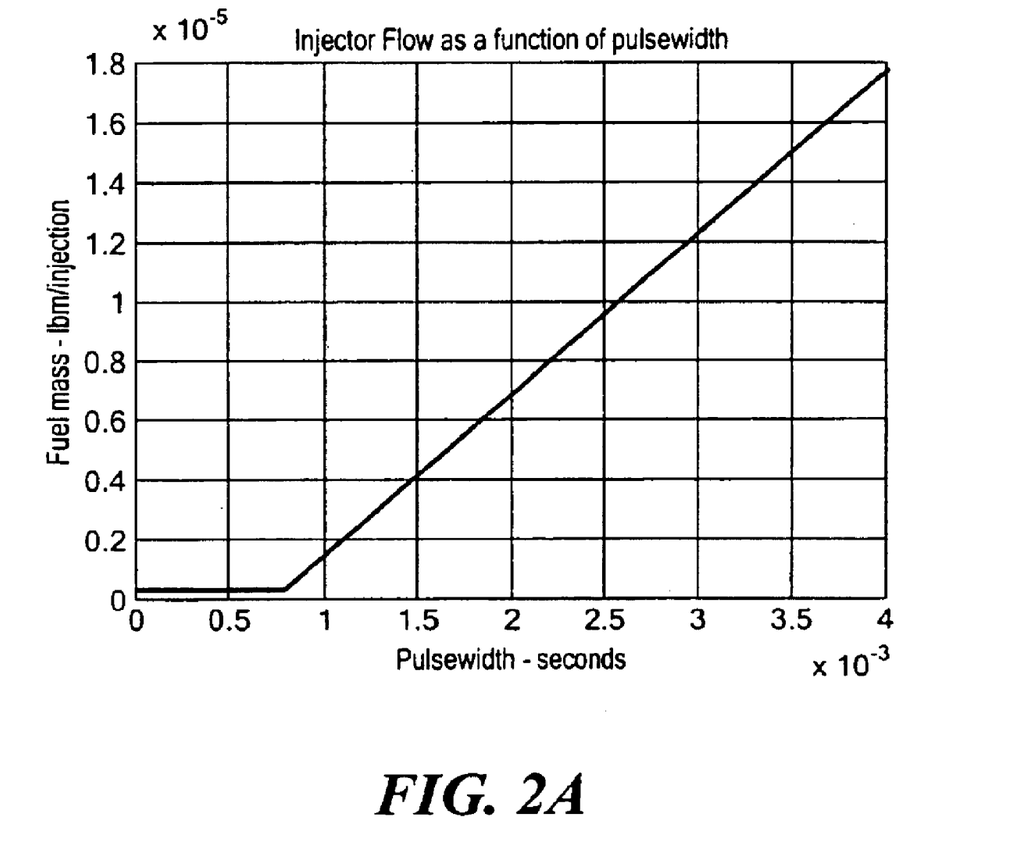

Referring to FIG. 2, a functional diagram shows the process used to project the Start of Injection (SOI) of the fuel as a function of crank angle ($\phi$). As will be described, the calculation for SOI ($\phi$) is made is a function of a projected engine speed, $N_P$.

More particularly, a targeted End of fuel Injection (EOI ($\phi$)|$_{target}$) is determined from a measure of Mass Air Flow (MAF) to the cylinder and the measured engine speed $N_m$. (It is noted that manifold absolute pressure (MAP) may be used to compute mass air flow, in place of basing the computation on a signal from a MAF sensor). The engine speed, $N_m$, is here measured from information obtained by the crank position sensor 30. The targeted End of fuel Injection (EOI ($\phi$)|$_{target}$) for a typical port injected engine is here, in this example, obtained from a look up table or calculated as a function of engine speed $N_m$ and air mass flow (MAF), block 50.

As described above, the timing may also be changed for particular operating modes such as crank/start-up and during acceleration/deceleration demands of the operator.

Nominally, the fuel pulse width (FPW) is calculated to provide a desired air/fuel ratio (A/F) in the cylinders. Given an air flow rate, MAF, typically mass per unit time e.g. pounds/minute, and measured via an air flow sensor, or estimated from manifold pressure/engine speed, throttle position/engine speed, for example, and a desired air/fuel ratio (A/F), the necessary Fuel_Flow_Rate (in mass per time units) is calculated in accordance with:

Fuel_Flow_Rate=AirFlow/AirFuelRatio=MAF/(A/F)

From the calculated Fuel_Flow_Rate, (block 52) a quantity of fuel_per_injection is calculated (block 54) from the engine speed, (here a projected engine speed $N_P$, at the time, or crank angle, (block 53, i.e., from equations (1) and (2), below, or a table) when fuel is actually injected into the port or cylinder) and the number of injections desired per engine revolution (for a 4 cylinder, 4 stroke, PFI engine this would be typically 2 injections per engine revolution—one for each cylinder intake), in accordance with:

Fuel_Per_Injection=FuelFlow/($N_P$/InjectionsPerRevolution)

Given this fuel mass (i.e., Fuel_Per_Injection), for each injection event, i (here cylinder combustion), the necessary fuel pulse width FPW in units of time (second) is determined from a table using the known characteristics of the injector (block 56), the data in such tables being shown by a curve such as that in shown in FIG. 2A. It should be noted that these calculations typically include some modifications to account for the effects of the intake manifold filling time and fuel those puddles in the intake manifold.

Given a target end of injection, EOI ($\phi$)|$_{target}$, (typically in degrees of crankshaft rotation, $\phi$, from block 50) and the desired fuel pulse width FPW (in time, typically seconds, from block 56), the FPW (in time) is converted into a fuel pulse width in terms of crank angle, block 58, i.e., FPW ($\phi$), where FPW ($\phi$)=FPW (in time)/$N_P$.

The Start of Injection (SOI ($\phi$)) is thus equal to the sum of EOI ($\phi$) and −FPW ($\phi$) block 60, which sum is fed to the ECU. Thus, a determination is made as to the number of crankshaft degrees correspond to the injector fuel pulse width (SOI ($\phi$)). It would involve one more conversion between time-based parameter and angle-based parameter if the SOI is required to be time-based.

As described above, instead of using a current estimate of engine speed $N_m$ for this calculation for SOI ($\phi$), a projection of engine speed $N_P$ is used. Use of projected engine speed, $N_P$, particularly during engine start-up, more accurately determines the start of injection SOI ($\phi$) that will allow the injection to finish near the desired end of injection angle EOI ($\phi$).

Some applications use hardware that provides frequent updates of the crankshaft (e.g. every 10 degrees) that allow the injection activated (with reasonable accuracy) at the specified angle. Other applications receive much less frequent updates. For example, one known 4-cylinder engine gets position information every 90-crankshaft degrees (via an interrupt called Profile Ignition Pickup (PIP) edges. The start of injection must then be scheduled by specifying a time delay following one of these updates. Again, using the current engine speed to calculate the delay will result in a late start of injection (SOI ($\phi$) if the engine speed increases significantly such as it does during the start and run up. As noted above, in accordance with the present invention, the projected speed, $N_P$, is used to allow the actual start of injection (SOI ($\phi$)) to occur much closer to the desired timing.

Determination of Projected Engine Speed $N_P$

The projected speed Np for determination of the End of Injection (EOI) or Start of Injection (SOI ($\phi$)) relative to the proper crank angle position ($\phi$) associated with a next one of the cylinders to have fuel injection quantity determined therefore is as follows:

$$N_p = N_m + \Delta N_m|_i \qquad (1)$$

where: $N_m$ is measured engine speed; and
$\Delta N_m$ is a projected change in engine speed.
In one embodiment, the projected change in engine speed $\Delta N_m$ is here a polynomial model based:

$$\Delta N_m|_i = \sum_{1}^{n} a_i N_m^{n-i} \qquad (2)$$

where i is the event index (an event here being cylinder combustion) and n is the order of the polynomial used to estimate $\Delta N_m$. The constants in the polynomial are determined experimentally. Equation 2 indicates a dependence only on engine speed. Further improvements on the model are made by having the projected change in engine speed depends on other engine parameters: engine coolant temperature, ambient temperature, accessory loads, as examples.

For an engine run-up example, let it be assumed that the event index i is 1 (i.e., the event is for the calculation of cylinder, C, and that current measured engine speed is $N_m$ (1), or say 300 rpm. A calculation is made of the expected change in engine speed $\Delta N_m$ (1) in accordance with:

$$\Delta N_m(1) = a_0 + a_1 N_m(1)^1 + a_2 N_m(1)^2 + \ldots + a_n N_M(1)^{n-1}$$

or, in this example, $\Delta N(1) = a_0 + a_1(300)^1 + a_2(300)^2 + \ldots + a_n$ Since, for a particular engine, the coefficients $a_0$ through $a_n$ are known a priori as a result of testing the particular type engine at the factory and are functions of starting temperature for the start-up phase, to be described, and for tip-in/tip-out (i.e., acceleration/deceleration) are functions of the magnitude of the tip-in and tip-out, to be described. The calculated value for, $\Delta N_m(1)$ is used to determine the projected engine speed $N_P$ for next event—i.e., the $2^{nd}$ event. Let it be assumed in this example that the calculated result is $\Delta N_m(1) = 350$ rpm, then the predicted engine speed, $N_P$ for $1^{st}$ event is $N_P = N_m(1) + \Delta N_m(1) = 300$ rpm + 350 rpm = 650 rpm. For the second event, i=2, (i.e., for the next cylinder in the firing sequence), assume the measured engine speed is 655 rpm, or $N_m(2) = 655$ rpm. The predicted engine speed increment $\Delta N_m(2)$ is $\Delta N_m(2) = a_0 + a_1 N_m(2)^1 + a_2 N_m(2)^2 + \ldots + a_n N_m(2)^{n-1}$ or $\Delta N_m(2) = a_0 + a_1(655)^1 + a_2(655)^2 + \ldots + a_n(655)^{n-1}$. Thus, the predicted engine $+ \ldots + a_n(655)^{n-1}$. Thus, the predicted engine speed for 2nd event is determined from the engine speed change $\Delta N_m(2)$. More particularly, in this example, assume the result is for $\Delta N_m(2)$ is 250 rpm. The final predicted engine speed for $2^{nd}$ event is $N_P = N_m(2) + \Delta N_m(2) = 655 + 250 = 905$ rpm. The process continues as described for successively fired cylinders Thus, assuming that there is no misfiring in the start-up. We would able to cover other transient, tip-in and tip-out based on the same idea.

Thus, the method used to determine projected engine speed $N_P$ during engine start-up and during engine acceleration or deceleration is shown in FIG. 2. More particularly, as shown in FIG. 2, the mass airflow sensor provides a measure of the mass airflow (MAF) to the cylinder for which the fuel is being scheduled. Also the engine speed $N_P$ is measured from the crank position sensor. This measured MAF is combined with the measured engine speed, $N_m$, to determine a target $EOI(\phi)|_{target}$. The CID with CPS is used to identify the cylinder time scheduled to be fueled (i.e., the event, i). The polynomial in equation (2) predicts the change in speed $\Delta N_m$. This polynomial could be evaluated in real time by the PCM or used to generate a look up table stored in the PCM. The predicted engine speed $N_P$ is calculated in accordance with equation (1). The projected engine speed $N_P$ is used in the calculation of fuel_per_revolution and fuel pulse width $FPW(\phi)$.

The methods to determine the predicted speed described above, depend on a prediction of the expected amount of speed change due to the engine firing. As discussed above, this can determined from a model of the engine start up or a lookup table. In the most simple form, the lookup table or polynomial model are based on engine speed alone. Alternatively, the lookup table can be multi-dimensional to include additional engine parameters, which are known in the ECU and which are known to affect the predicted speed change during startup. In the case of a polynomial model, the model can also have factors relating to the additional engine variables, e.g., engine temperature. The methods described above are based on there being successful combustion in each cycle, that is, no misfire. Misfire is a rare event in a modern engine; thus, assuming no misfire is nearly accurate. In the unlikely event of a misfire, though, the engine turns more slowly than if the engine fired normally. According to the assumption of no misfire, the fuel injection, if a misfire occurs, is earlier than desired. Although not desirable, the injected fuel remains in the intake port until the intake valve opens and the fuel and air are drawn into the cylinder. This "error" in timing does not lead to a further misfire.

Engine Start-Up

Figure 3A:
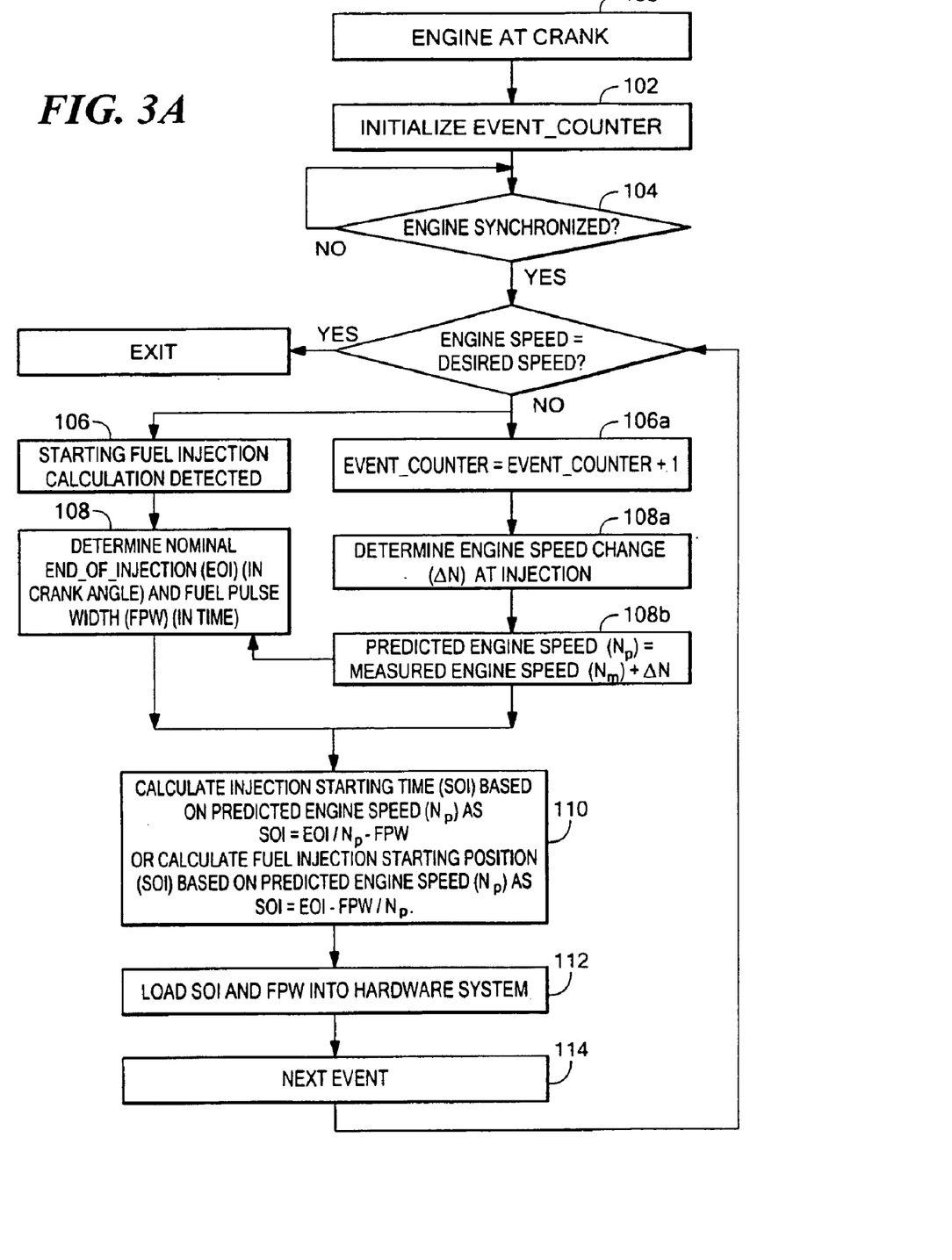
FIG. 3A is a flow diagram of the process used to determine start of injection (SOI) and FPW based on an estimated, or projected, engine speed, $N_P$ during start-up.

Referring to FIG 3A the process used during engine start-up is described, in Step 100, engine crank is sensed. In Step 102, an event, i, counter is initialized. At Step 104, a determination is made as to whether the engine is synchronized (i.e., whether the engine rotational position has been established). If the engine is synchronized, in Step 104, the fuel injection calculations are started and die event counter is incremented (Step 106a).

In Step 108, a determination is made of a target END_OF_INJECTION (EOI), in crank angle, (i.e., $EOI(\phi)|_{target}$) and the fuel pulse width (FPW) in time. The projected engine speed $N_P$ is calculated (as described above in connection with FIG. 2) by determining the projected change in engine speed $\Delta N_m$ from equation (2) in Step 108a and adding such projected change is engine speed to the measured engine speed $N_m$ in accordance with equation (1) above (Step 108b).

In Step 110, the determined fuel pulse width (FPW) is converted to angle-based or $EOI(\phi)$ is converted to time-based using the projected engine speed, $N_P$=measured engine speed $(N_m) + \Delta N_m$, from equation (1) above. Using the projected engine speed, $N_P$, a final injection start SOI (in time) is determined if the control requires SOI in time using either:

SOI=(EOI/$N_P$)−FPW, or determine SOI in staring position based on:

SOI=EOI−(FPW*$N_P$).

The final SOI, i.e., SOI_final with other compensations, and FPW are loaded into the hardware system (Step 112). The process then returns to the next event (Step 114).

Figure 4:
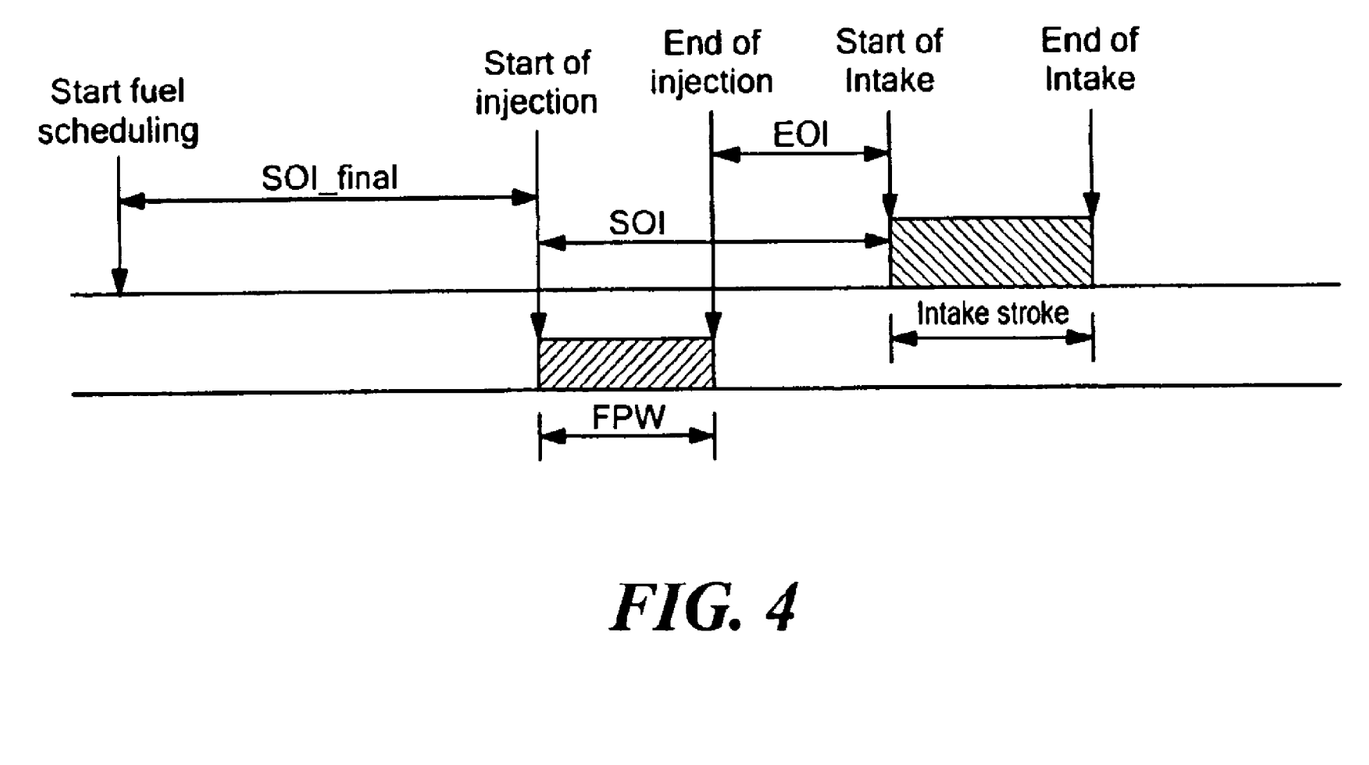
FIG. 4 is a timing diagram showing the fuel injection time scheduling using the process shown in FIGS. 2, 3A and 3B.

A timing diagram of the process is shown in FIG. 4.

Acceleration and Deceleration After Start-Up

Figure 3B:
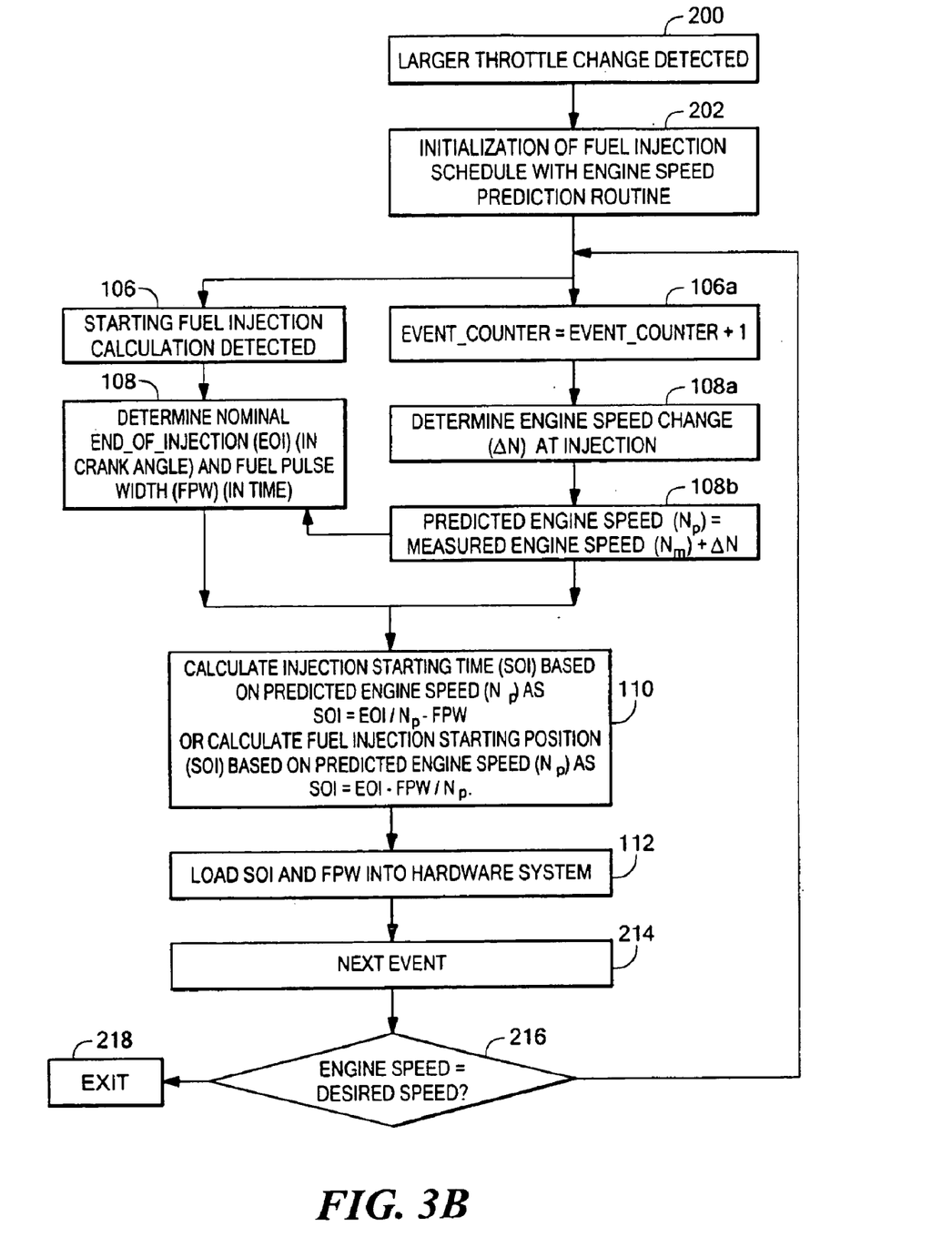
FIG. 3B is a flow diagram of the process used to determine start of injection (SOI) and FPW based on an estimated, or projected, engine speed, $N_P$ during acceleration and deceleration after start-up.

Referring now to FIG. 3B, the process used during an acceleration or deceleration after engine start-up is described. In Step 200, a large throttle change is detected indicating an acceleration or deceleration. In Step 202, the process initializes the fuel injection time schedule with predicted engine speed $N_P$ as determined in accordance with Step 108a (FIG. 3A), it being understood that engine speed is being predicted during both start-up and subsequent engine operation in accordance with the process described above in equation (1) (as described above in connection with FIG. 2) by determining the projected change in engine speed $\Delta N_m$ from equation (2).

The process thus continues in accordance with Steps 106, 108, 106a, 108a, 108b, 110, 112 and 114, as described in FIG. 3A. After step 114, however, in Step 116, a determination is made as to whether the actual engine speed is the described engine speed (i.e., whether an acceleration or deceleration is still being demanded). If no whether an acceleration or deceleration is being demanded, the process exits (Step 218). If, on the other hand, the acceleration or deceleration is still being demanded, the process then returns to the next event (Step 114).

A number of embodiments of the invention have been described. Nevertheless, it will be understood that various modifications may be made without departing from the spirit and scope of the invention. Accordingly, other embodiments are within the scope of the following claims.

What is claimed is:

1. A method for determining fuel injection lime scheduling in an internal combustion engine, comprising:
   measuring engine speed; and
   calculating a time for fuel injection into the engine using a prediction of engine speed at the time of such fuel injection, such prediction of engine speed being the measured engine speed plus a projected change in engine speed, such projected change in engine speed being a function of cylinder event firing number and the measured engine speed.

2. The method recited in claim 1 wherein the prediction of engine speed is based on a measure of engine speed, said basis being in the form of a polynomial.

3. The method recited in claim 1 wherein the prediction of engine speed is determined from a look-up table.

4. The method recited in claim 1 wherein the predicted engine speed is used to determine fuel per injection, the method further including:
   determining fuel pulse width, in time, as a function of the determined fuel per injection; and
   converting the determined fuel pulse width, in time, to fuel pulse width, in crank degrees, such conversion being determined as a function of the predicted engine speed.

5. The method recited in claim 4 wherein the prediction of engine speed is based on a measure of engine speed, said basis being in the form of a polynomial.

6. The method recited in claim 4 wherein the prediction of engine speed is determined from a look-up table.

7. The method recited in claim 4 wherein the prediction of engine speed is performed during engine startup.

8. The method recited in claim 7 wherein the prediction of engine speed is based on a measure of the current engine speed and the number of events since the start of engine cranking.

9. A system for determining fuel injection time scheduling in an internal combustion engine, such system comprising:
   a fuel injector;
   a processor for calculating a time of fuel injection for the fuel injector to inject such, fuel into engine using a prediction of engine speed at the time of such fuel injection such prediction of engine speed being measured engine speed plus a projected change in such measured engine speed, such projected change in engine speed being a function of cylinder event firing number and the measured engine speed.

10. The system recited in claim 9 wherein the precessor predicts engine speed from is based on a measure of engine speed, said basis being in the form of a polynomial.

11. The system recited in claim 9 wherein the prediction of engine speed is determined from a look-up table.

12. The system recited in claim 9 wherein the prediction of engine speed is performed during engine startup.

13. The system recited in claim 12 wherein the prediction of engine speed is based on a measure of the current engine speed and the number of events since the start of engine cranking.

14. The system recited in claim 9 wherein the processor uses the predicated engine speed to: determine fuel per injection; determine fuel pulse with in time as a function of the determined fuel per injection; and convert the determined fuel per injection in time to fuel per injection as a function of engine rotation angle, such conversion being determined as a function of the predicted engine speed.

15. A method for determining fuel injection quantity and injection timing for an internal combustion engine, comprising:
   calculating the fuel injection quantity and the time for fuel injection into the engine using a prediction of engine speed at the time of such fuel injection, such prediction of engine speed being measured engine speed plus a projected change in such measured engine speed, such projected change in engine speed being a function of cylinder event firing number and the measured engine speed.

16. The method recited in claim 15 wherein the predicated engine speed is used to determine fuel per injection and wherein the method includes:
   determining fuel pulse with in time as a function of the determined fuel per injection; and
   converting the determined fuel per injection in time to fuel per injection as a function of engine rotation angle, such conversion being determined as a function of the predicted engine speed.

* * * * *